US011858479B2

(12) United States Patent
Park et al.

(10) Patent No.: US 11,858,479 B2
(45) Date of Patent: Jan. 2, 2024

(54) WASHER FLUID DISTRIBUTION DEVICE AND METHOD OF DISTRIBUTING WASHER FLUID

(71) Applicants: Hyundai Motor Company, Seoul (KR); Kia Corporation, Seoul (KR); DY AUTO Corporation, Chungcheongnam-do (KR)

(72) Inventors: Jong Min Park, Seoul (KR); Nak Kyoung Kong, Gyeonggi-do (KR); Seung Sik Han, Gyeonggi-do (KR); Ki Hong Lee, Seoul (KR); Min Wook Park, Incheon (KR)

(73) Assignees: Hyundai Motor Company, Seoul (KR); Kia Corporation, Seoul (KR); DY Auto Corporation, Ansan (KR)

( * ) Notice: Subject to any disclaimer, the term of this patent is extended or adjusted under 35 U.S.C. 154(b) by 67 days.

(21) Appl. No.: 18/074,139

(22) Filed: Dec. 2, 2022

(65) Prior Publication Data
US 2023/0099826 A1    Mar. 30, 2023

Related U.S. Application Data

(62) Division of application No. 16/938,122, filed on Jul. 24, 2020.

(30) Foreign Application Priority Data

Mar. 24, 2020   (KR) .................. 10-2020-0035718

(51) Int. Cl.
B60S 1/52        (2006.01)
B60S 1/56        (2006.01)
(Continued)

(52) U.S. Cl.
CPC ............... *B60S 1/526* (2013.01); *B60S 1/481* (2013.01); *B60S 1/482* (2013.01); *B60S 1/486* (2013.01);
(Continued)

(58) Field of Classification Search
CPC .......... B60S 1/481; B60S 1/482; B60S 1/483; B60S 1/485; B60S 1/486; B60S 1/52;
(Continued)

(56) References Cited

U.S. PATENT DOCUMENTS 1,016,382 A * 2/1912 Weeden ............... F16K 11/083
                                                137/625.16
1,789,390 A   1/1931 Potteiger
(Continued)

FOREIGN PATENT DOCUMENTS

EP    3466774 A1 *  4/2019  ............... B05B 1/28
EP    3767140 A1 *  1/2021  ......... A61H 33/0087
(Continued)

OTHER PUBLICATIONS

Non-Final Office Action dated Apr. 17, 2023 in U.S. Appl. No. 16/938,122.

*Primary Examiner* — William M McCalister
(74) *Attorney, Agent, or Firm* — Fox Rothschild LLP

(57) ABSTRACT

A washer fluid distribution device includes a plurality of nozzle units formed consecutively, a transfer conduit configured to pass through the plurality of nozzle units and having one end fluidly connected to an introduction part, the introduction part located at one end of the transfer conduit and configured to allow a washer fluid to be introduced from a washer pump, a plurality of discharge holes configured to correspond to the number of the nozzle units in the transfer conduit and having different angles based on a center of the transfer conduit, and a controller configured to control a
(Continued)

rotation angle of the transfer conduit to allow the discharge holes to correspond to the nozzle units in response to a user's request.

10 Claims, 9 Drawing Sheets

(51) Int. Cl.
 *B60S 1/48* (2006.01)
 *F16K 11/085* (2006.01)
(52) U.S. Cl.
 CPC . *B60S 1/52* (2013.01); *B60S 1/56* (2013.01); *F16K 11/085* (2013.01); *Y10T 137/86027* (2015.04); *Y10T 137/86501* (2015.04); *Y10T 137/86533* (2015.04); *Y10T 137/86863* (2015.04)
(58) Field of Classification Search
 CPC .... B60S 1/526; B60S 1/56; Y10T 137/86027; Y10T 137/86501; Y10T 137/86533; Y10T 137/86863; F16K 11/085
 USPC .......................... 137/625.11, 625.15, 625.46
 See application file for complete search history.

(56) References Cited

U.S. PATENT DOCUMENTS

| | | | |
|---|---|---|---|
| 1,893,896 A | 1/1933 | Heftler | |
| 2,381,910 A | 8/1945 | Joy | |
| 2,641,280 A | 6/1953 | Fleischhauer | |
| 3,033,226 A | 5/1962 | Allen | |
| 3,057,300 A | 10/1962 | Ulbing | |
| 3,090,396 A | 5/1963 | Rudelick | |
| 3,094,173 A | 6/1963 | Hausmann | |
| 3,395,046 A | 7/1968 | Levine | |
| 3,601,139 A | 8/1971 | Kontranowski | |
| 3,837,360 A | 9/1974 | Bubula | |
| 3,941,154 A | 3/1976 | Bishop | |
| 4,263,937 A | 4/1981 | Rudenko | |
| 4,312,377 A | 1/1982 | Knecht | |
| 4,391,572 A | 7/1983 | Lew | |
| 4,553,566 A | 11/1985 | Barclay | |
| 5,343,893 A | 9/1994 | Hogan | |
| 5,474,102 A | 12/1995 | Lopez | |
| 5,517,800 A | 5/1996 | Brenner | |
| RE35,866 E | 8/1998 | Simmons | |
| 5,937,903 A | 8/1999 | Afshar | |
| 6,490,740 B1 | 12/2002 | Gardenier | |
| 6,951,223 B2 * | 10/2005 | Fukushima | ............... B60S 1/58 134/186 |
| 7,641,131 B2 * | 1/2010 | Shank | ..................... B60S 1/487 239/128 |
| 7,997,302 B2 * | 8/2011 | Henderson | .............. B60S 1/481 251/129.09 |
| 8,905,076 B2 | 12/2014 | Jorgensen | |
| 8,985,480 B2 * | 3/2015 | Kikuta | .................... B60S 1/583 239/289 |
| 9,644,905 B2 | 5/2017 | Rusich | |
| 10,384,653 B2 * | 8/2019 | Shank | ..................... B60S 1/482 |
| 11,407,384 B2 * | 8/2022 | Agrotis | .................. B60S 1/56 |
| 11,427,163 B2 * | 8/2022 | Kubota | .................. B60S 1/603 |
| 2002/0137455 A1 * | 9/2002 | Ivanov | .................... B60S 1/482 454/157 |
| 2003/0098077 A1 | 5/2003 | McLane et al. | |
| 2003/0222156 A1 * | 12/2003 | Bissonnette | ............ B60S 1/481 239/284.1 |
| 2005/0236051 A1 | 10/2005 | McBeth et al. | |
| 2011/0272049 A1 | 11/2011 | Jorgensen et al. | |

FOREIGN PATENT DOCUMENTS

| | | |
|---|---|---|
| KR | 10-2009-0047963 A | 5/2009 |
| WO | 2018/059793 A1 | 4/2018 |

* cited by examiner

< WASHER PUMP CURRENT AND STEP MOTOR TIMING CHART >

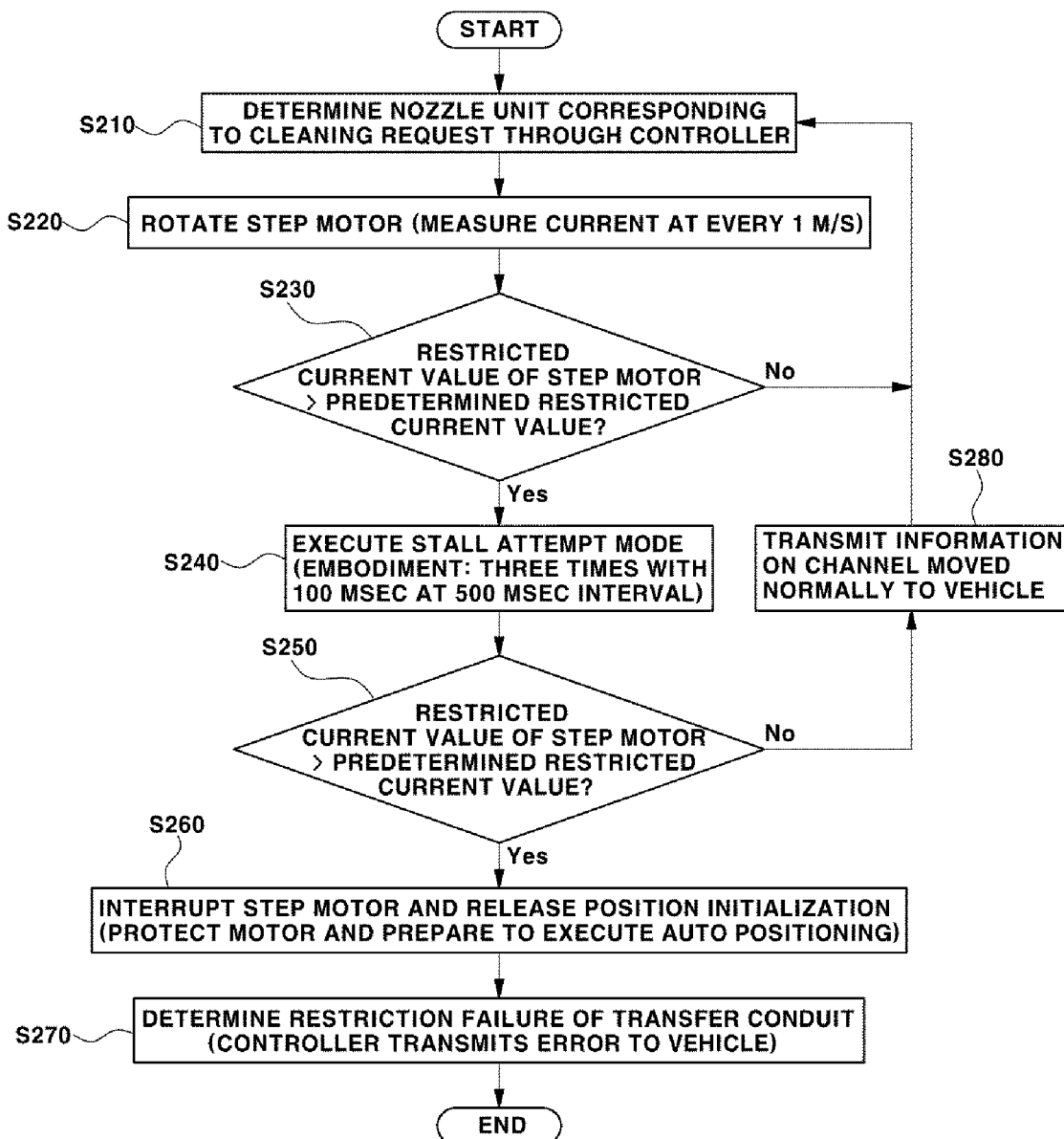

WASHER FLUID DISTRIBUTION DEVICE AND METHOD OF DISTRIBUTING WASHER FLUID

CROSS-REFERENCE TO RELATED APPLICATION

This application is a Divisional Application from U.S. application Ser. No. 16/938,122, filed Jul. 24, 2020, which claims priority to Korean Patent Application No.: 10-2020-0035718, filed on Mar. 24, 2020. The disclosures of which are incorporated herein by reference in their entirety.

BACKGROUND

(a) Technical Field

The present disclosure relates to a washer fluid distribution device and a method of distributing a washer fluid, more particularly, to controlling a step motor for performing rotation of a transfer conduit and measuring a failure according to the control so as to perform washer fluid distribution of a washer fluid distribution device including a plurality of nozzle units which are sequentially engaged.

(b) Description of the Related Art

Conventionally, a washer pump system is mounted on a vehicle to selectively supply a washer fluid in a washer tank to a front windshield or a rear windshield.

Since a surface of the windshield is frequently contaminated with foreign material such as dust and the like, in order to sufficiently allow a driver to see through the windshield and achieve safe operation, the foreign material such as dust and the like on the surface of the windshield should be removed.

As described above, in order to remove the foreign material and the like on the windshield of the vehicle, the vehicle is provided with a washer nozzle for spraying a washer fluid together with a wiper system.

Therefore, when a driver operates a washer switch installed in a driver seat so as to clear a field of view, a washer motor in conjunction with the washer switch operates, and the washer liquid stored in a washer fluid storage tank is sprayed to the windshield through the washer nozzle due to an operation of the washer motor. Through the sprayed washer fluid and a wiper operation, the foreign material are removed so that the driver can safely drive in a state in which the field of view is secured.

However, in recent years, when contaminants are attached to various devices (a camera, radio detecting and ranging (RADAR), light detecting and ranging (LiDAR), and the like) which are coupled to an outer side of the vehicle for autonomous driving, there occurs a problem in measuring data for performing the autonomous driving. Stability of the vehicle is significantly threatened by such devices which are impossible to measure data.

Therefore, a washer fluid distribution device for providing a washer fluid sprayed to various positions is required.

SUMMARY

In one aspect, the present disclosure provides a washer fluid distribution device including a plurality of flow paths through a single washer pump motor, and a method of distributing a washer fluid.

In another aspect, the present disclosure provides a washer fluid distribution device including a discharge hole of a transfer conduit configured to correspond to a nozzle unit and configured to be located at a position corresponding to each nozzle unit through rotation of the transfer conduit.

In still another aspect, the present disclosure provides a washer fluid distribution device and a method of distributing a washer fluid, which are capable of determining a position and a restriction failure of a transfer conduit by measuring current values of a step motor and a washer pump motor.

Objectives of the present disclosure are not limited to the above-described objectives, and other objectives of the present disclosure, which are not mentioned, can be understood by the following description and also will be apparently understood through embodiments of the present disclosure. Further, the objectives of the present disclosure can be implemented by means described in the appended claims and a combination thereof.

A washer fluid distribution device and a method of distributing a washer fluid for achieving the objectives of the present disclosure includes the following configuration.

In an exemplary embodiment, the present disclosure provides a washer fluid distribution device includes a plurality of nozzle units formed consecutively; a transfer conduit configured to pass through the nozzle unit and having one end fluidly connected to an introduction part; the introduction part located at one end of the transfer conduit and configured to allow a washer fluid to be introduced from a washer pump; a plurality of discharge holes configured to correspond to the number of the nozzle units in the transfer conduit and having different angles based on a center of the transfer conduit; and a controller configured to control a rotation angle of the transfer conduit to allow the discharge holes to correspond to the nozzle units in response to a user's request.

Also, washer fluid distribution device may further include an insertion part configured to engage one end of each of the plurality of nozzle units to an adjacent nozzle unit, and a hook groove formed such that the insertion part is engaged with one end of the adjacent nozzle unit.

Further, the controller may set a position, at which a discharge hole adjacent to a center of the transfer conduit in a length direction is fluidly connected to the nozzle unit, as an initial position.

Further, the nozzle unit may be configured to be fluidly connected to one or more among a camera, light detection and ranging (LiDAR), and radio detecting and ranging (RADAR) which are located at an outer side of a vehicle.

Further, the washer fluid distribution device may further include a step motor provided at the other end of the transfer conduit and configured to apply a driving force to allow the washer fluid to be moved the nozzle unit.

Further, the controller may determine a stall current value applied to the step motor, and, when the measured stall current value exceeds a predetermined stall current value, the controller may determine the transfer conduit as being in a restriction failure.

Further, when the transfer conduit is determined as being in the restriction failure, the controller may set to switch to a protective mode.

Further, the controller may set an amount of rotation of the transfer conduit and determine whether the discharge hole is rotated to a position corresponding to the nozzle unit, thereby determining whether a position failure of the transfer conduit occurs.

Further, in a state in which the discharge hole is rotated to a position corresponding to the nozzle unit, when a rate of change in current applied to the washer pump motor exceeds a predetermined rate of change in current, the controller may determine the transfer conduit as being in the position failure.

Further, when a case in which the rate of change in current applied to the washer pump motor with respect to the same nozzle unit exceeds the predetermined rate of change in current is regenerated, the controller may determine the transfer conduit as being in the position failure.

In another exemplary embodiment, the present disclosure provides a method of distributing a washer fluid, which includes determining, by a controller, whether an initial condition is satisfied; when the initial condition is satisfied, determining, by the controller, an input of a cleaning request; moving, by the controller, a transfer conduit such that a discharge hole is located at a position corresponding to a nozzle unit; when the discharge hole of the transfer conduit is located at a position corresponding to the nozzle unit, driving, by the controller, a washer pump motor; and measuring, by the controller, current values applied to the washer pump motor and a step motor and detecting a failure.

Further, the determining of the initial condition may include executing an autonomous driving mode of the vehicle.

Further, the measuring, by the controller, of the current values applied to the washer pump motor and the step motor and the detecting of the failure may include transmitting an error signal to a user when the current values applied to the washer pump motor and the step motor are out of an normal range.

Further, the determining of the initial condition may include switching the transfer conduit from a set position to an initial position.

Further, the switching of the transfer conduit from the set position to the initial position may include moving the transfer conduit to the set position, and moving the transfer conduit to the initial position in a state in which a restrained current is applied to the step motor for a time that is longer than a predetermined sustaining time.

Further, the measuring, by the controller, of the current values applied to the washer pump motor and the step motor and the detecting of the failure may include detecting a position failure of the transfer conduit, and detecting a restriction failure of the transfer conduit.

Further, the detecting of the position failure of the transfer conduit may include measuring, by the controller, a rate of change in current applied to the washer pump motor in a state in which the discharge hole of the transfer conduit is controlled to be located at a position corresponding to the nozzle unit; determining whether the measured rate of change in current exceeds a rate of change in current predetermined in the controller; when the measured rate of change in current exceeds the predetermined rate of change in current, re-determining whether the rate of change in current of the washer pump motor exceeds the predetermined rate of change in current in the same nozzle unit; and when the rate of change in current is determining as exceeding the predetermined rate of change in current in the same nozzle unit, determining the transfer conduit as being in the position failure.

Further, the determining of the transfer conduit as being in the position failure may include transmitting failure information to a vehicle.

Further, the detecting of the restriction failure of the transfer conduit may include measuring a stall current value of the step motor; determining whether the measured stall current value of the step motor exceeds a predetermined stall current value; and when the measured stall current value of the step motor exceeds the predetermined stall current value, determining that a restriction failure of the transfer conduit occurs and transmitting failure information.

Further, the determining of whether the measured stall current value of the step motor exceeds the predetermined stall current value may include when the measured stall current value of the step motor exceeds the predetermined stall current value, executing a stall attempt mode; re-determining whether the stall current value of the step motor exceeds the predetermined stall current value; and when the stall current value of the step motor re-exceeds the predetermined stall current value, interrupting the step motor.

Other aspects and preferred embodiments of the present disclosure are discussed infra.

BRIEF DESCRIPTION OF THE DRAWINGS

The above and other features of the present disclosure will now be described in detail with reference to certain exemplary embodiments thereof illustrated the accompanying drawings which are given herein below by way of illustration only, and thus are not limitative of the present disclosure, and wherein:

FIG. 7 is a flowchart illustrating determination of the restriction failure state of the transfer conduit according to one embodiment of the present disclosure.

Figure 1:
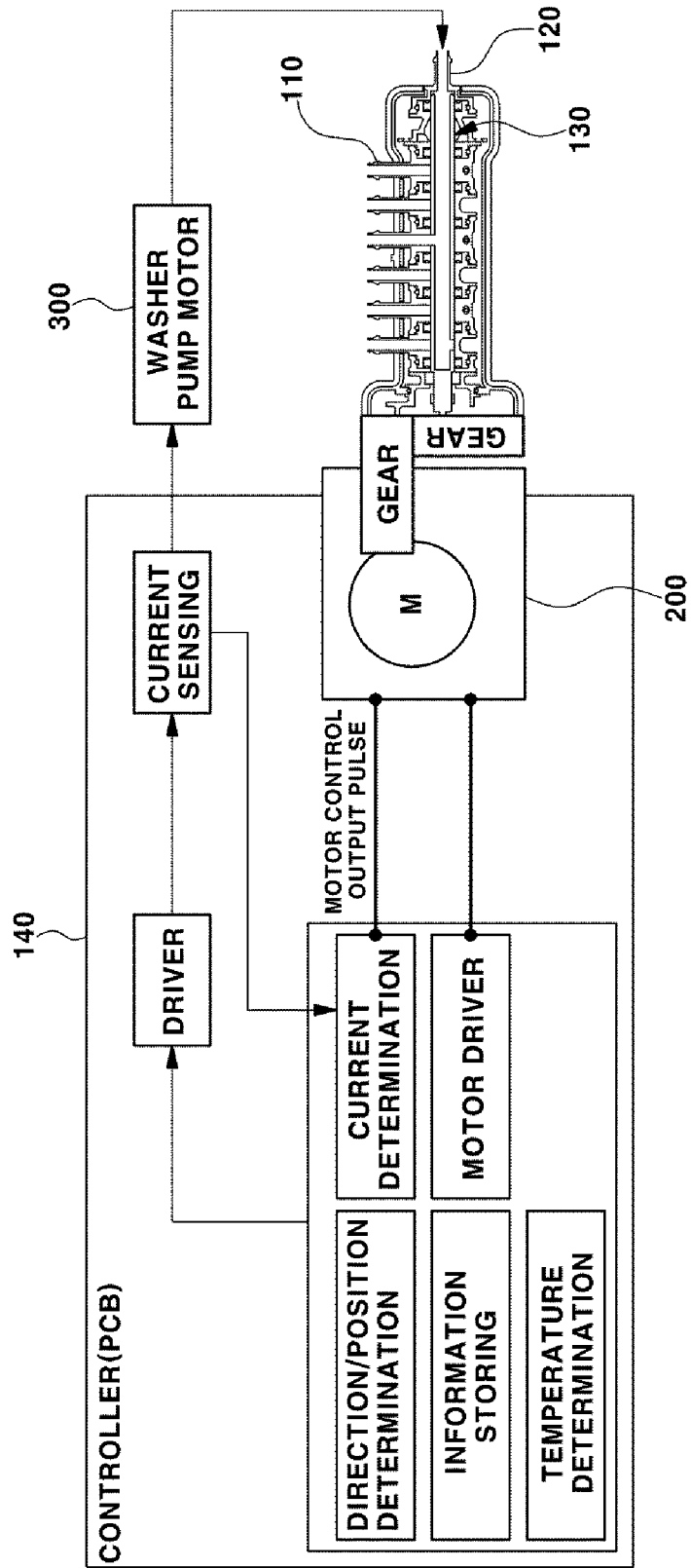
FIG. 1 is a block diagram illustrating a washer fluid distribution device according to one embodiment of the present disclosure.

It should be understood that the appended drawings are not necessarily to scale, presenting a somewhat simplified representation of various preferred features illustrative of the basic principles of the present disclosure. The specific design features of the present disclosure as disclosed herein, including, for example, specific dimensions, orientations, locations, and shapes will be determined in part by the particular intended application and use environment.

In the figures, reference numbers refer to the same or equivalent parts of the present disclosure throughout the several figures of the drawing.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Hereinafter, embodiments of the present disclosure will be described in detail with reference to the accompanying drawings. The embodiments of the present disclosure can be modified in various forms, and the scope of the present disclosure should not be construed as being limited to the following embodiments. These embodiment are provided to more fully describe the present disclosure to those skilled in the art.

Further, the term "— part," "— unit," "— motor," or the like used herein means a unit for processing at least one function or operation, and this unit may be implemented by hardware, software, or a combination of hardware and software.

Further, in the specification, the terms a first, a second, and the like are assigned to components so as to discriminate these components because names of the components are the same, but these terms are not necessarily limited to the order in the following description.

The present disclosure relates to a washer liquid distribution device 100 and a method of distributing a washer liquid to various devices located on an outer side of a vehicle and contaminated by particles such as dust, dirt, etc.

A device located outside the vehicle includes a camera for providing one or more of a front image, a rear image, and a side image of the vehicle, and a light detection and ranging (LiDAR) and a radio detection and ranging (RADAR) for receiving driving information.

More preferably, for example, the LiDAR, which receives driving information of the vehicle so as to perform autonomous driving, is connected to a LiDAR device which is a sensor. The LiDAR device may include a laser transmission module, a laser detection module, a signal collection and processing module, and a data transmission/reception module. Laser light sources preferably having wavelengths in a wavelength range of 250 nm to 11 µm or capable of varying their wavelength are used. Further, the LiDAR device is classified into a time of flight (TOF) type LiDAR device and a phase shift type LiDAR device according to a signal modulation method.

The LiDAR controls the LiDAR device and other devices connected to the LiDAR device (e.g., a LiDAR processor (not shown) for processing a LiDAR sensing output). For example, such control includes power supply control, reset control, clock (CLK) control, data communication control, memory control, and the like. Meanwhile, the LiDAR device is used to sense a front area of the vehicle. Such a LiDAR device is located on a front surface inside the vehicle, preferably below a front windshield to transmit and receive laser light through the front windshield.

Further, for example, the RADAR is connected to a RADAR device which is a sensor. The RADAR device is a sensor device for measuring a distance, a speed, and an angle of an object using electromagnetic waves. When the RADAR device is used, an object in a front side up to 150 m in a horizontal angle of 30 degrees may be detected using a frequency modulation carrier wave (FMCW) method or a pulse carrier method. The RADAR controls the RADAR device and other devices connected to the RADAR device (e.g., a RADAR processor (not shown) for processing a RADAR sensing output).

As described above, when contaminants are attached to not only the camera but also the LiDAR and the RADAR, it is impossible to receive driving environment information in an autonomous driving condition of the vehicle, a structure of a spray device capable of spraying a washer fluid onto each device is required.

Figure 2:
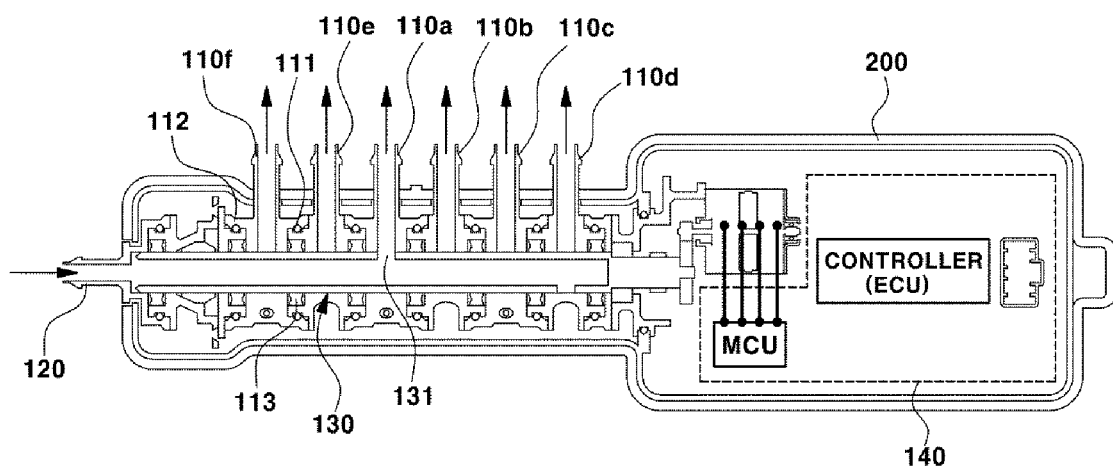
FIG. 2 is a diagram illustrating a coupling relationship between nozzle units of the washer fluid distribution device according to one embodiment of the present disclosure.

FIGS. 1 and 2 illustrate a configuration of a washer fluid spray device of the present disclosure.

As shown in FIGS. 1 and 2, the washer fluid spray device includes a plurality of nozzle units 110 configured to selectively spray a washer fluid onto each instrument or device requiring a spray.

In one embodiment of the present disclosure, six nozzle units 110 are provided, and each of the six nozzle units 110 is configured to be fluidly connected to each instrument requiring a washer fluid spray.

The nozzle unit 110 is located to include a hollow and includes a transfer conduit 130 located inside the hollow. One end of the transfer conduit 130 includes an introduction part 120 so as to allow the washer fluid to be introduced into the transfer conduit 130, and the transfer conduit 130 includes discharge holes 131 corresponding to the number of the nozzle units 110 to allow the washer fluid introduced in a length direction of the transfer conduit 130 to selectively move through each of the nozzle units 110.

The discharge hole 131 may be switched to a position corresponding to each of the nozzle units 110, which is configured in the length direction, according to rotation of the transfer conduit 130. In one embodiment of the present disclosure, six discharge holes 131 are located in the length direction of the transfer conduit 130, and the six discharge holes 131 are formed to be spaced at 60 degrees from each other based on a central axis of the transfer conduit 130.

One end of the transfer conduit 130 adjacent to the introduction part 120 is engaged with a step motor 200. Further, a pulse current is applied to the step motor 200 according to an amount of rotation applied from a controller 140, and thus the transfer conduit 130 is rotated so that the nozzle unit 110 fluidly connected to an instrument requiring cleaning is located to face the discharge hole 131. Consequently, the washer fluid introduced through the introduction part 120 is discharged through the selected nozzle unit 110.

The introduction part 120 located at one end of the transfer conduit 130 is configured to be fluidly connected to a washer fluid reservoir (not shown) and configured such that a washer fluid is introduced into the introduction part 120 through a water pump between the washer fluid reservoir and the introduction part 120.

Since the nozzle units 110 are configured to be adjacent to each other and to be engaged with each other, the number of the nozzle units 110 may be set according to a selection of a user. The nozzle unit 110 includes an insertion part 111 configured to be inserted into an adjacent nozzle unit 110, and a hook groove 112 located in the adjacent nozzle unit 110 to fix the insertion part 111.

Thus, it is configured such that the insertion part 111 and the hook groove 112 are engaged between two adjacent nozzle units 110 to be fixed to each other.

Further, a sealing ring 113 may be included between the insertion part 111 and the hook groove 112 so that water leak generated from a coupling between the nozzle units 110 may be prevented.

The controller 140 may measure current values applied to a washer pump motor 300 and the step motor 200 and times during which currents are applied and receive ambient temperature values from a temperature sensor located in the washer liquid distribution device 100.

Further, in an autonomous driving condition of the vehicle, the controller 140 may receive a cleaning request signal with respect to the camera, the LiDAR, the RADAR, or the like. More preferably, when driving information measured by the camera, the LiDAR, or the RADAR is less than a predetermined value, the controller 140 may be controlled to automatically spray the washer fluid to a corresponding device.

Further, the controller 140 may be configured to receive rotation information of the transfer conduit 130 and set an initial position of the transfer conduit 130. In the setting of the initial position of the transfer conduit 130, the controller 140 is configured to initially rotate a guide 210 of the step motor 200 to the set position and then rotate the guide 210 to the initial position.

Thus, as the guide 210 of the step motor 200 is rotated, the transfer conduit 130 engaged with one end of the step motor 200 is configured to be integrally rotated with the step motor 200.

Further, the controller 140 may be configured to compensate for the current values applied to the step motor 200 and the washer pump motor 300 and times during which the current values are applied according to a variation in temperature condition through a temperature sensor located in the washer liquid distribution device 100.

As described above, since the compensation for the current values and the times during which the current values are applied is performed in response to the variation in temperature condition, a revolution per minute and a torque value of the washer pump motor 300 are consistently maintained so that a discharge pressure of the washer fluid introduced through the introduction part 120 is controlled to not be varied.

Further, even when an ambient temperature of the washer liquid distribution device 100 varies, a pulse voltage and a time, which are applied through the step motor 200, are compensated for so that an amount of rotation of the transfer conduit 130 may be consistently maintained.

The initial position of the transfer conduit 130 may be set to a position corresponding to the discharge hole 131 which corresponds to the nozzle unit 110 closest to a center of the transfer conduit 130 in the length direction.

Therefore, the transfer conduit 130 is rotated in a clockwise direction or a counterclockwise direction based on the initial position so that the selected nozzle unit 110 and the discharge hole 131 corresponding thereto face each other.

More preferably, the controller 140 is configured to control the pulse input of the step motor 200 to allow the transfer conduit 130 to be rotated from the set position to the initial position and configured to store the controlled pulse input.

As described above, since the initial position of the transfer conduit 130 is located at the position corresponding to the discharge hole 131 which corresponds to the nozzle unit 110 adjacent to the center of the transfer conduit 130 in the length direction, it is configured to minimize a delay time due to the rotation of the transfer conduit 130 according to the bidirectional rotation of the step motor 200.

In one embodiment of the present disclosure, the transfer conduit 130 is configured to be moved from the set position to the initial position when a starting is turned on or power is applied, and thus the step motor 200 applies pulse power to move the transfer conduit 130 from the set position to the initial position.

In order to rotate the transfer conduit 130 from the set position to the initial position, the controller 140 is configured to store the number of pulse powers applied from the step motor 200 and an application time. The controller 140 is configured to perform initialization of the transfer conduit 130 by applying the stored pulse power in response to a restriction failure or a position failure of the transfer conduit 130.

The controller 140 is configured to determine the position failure of the transfer conduit 130 and configured to measure a rate of change in current of the washer pump motor 300 in a state in which the current is applied from the controller 140 to the step motor 200.

The rate of change in current of the washer pump motor 300, which is to be measured, is a concept including both a current value being applied and a time during which the current value is applied.

As described above, when the measured rate of change in current of the washer pump motor 300 exceeds a predetermined rate of change in current, the controller 140 determines the transfer conduit 130 as being in a position failure.

That is, when the washer fluid introduced through the reservoir is not discharged to the nozzle unit 110 via the discharge hole 131, the rate of change in current applied to the washer pump motor 300 is increased. When the current value and a current application time exceed the predetermined rate of change in current, the controller 140 determines the transfer conduit 130 as being in a position failure with the rate of change in current applied to the washer pump motor 300.

When the transfer conduit 130 is determined as being in the position failure, the controller 140 is configured to transmit a failure state to the user.

Further, when the transfer conduit 130 is not rotated due to a physical restriction thereof, the controller 140 determines the transfer conduit 130 as being in a restriction failure. When a stall current value applied to the step motor 200 is measured, and the measured stall current value exceeds a predetermined stall current value, the controller 140 determines the transfer conduit 130 as being in a restriction failure. The stall current value means the current in which the current value is increased by an overload if the motor is applied the power source by mechanical failure or external interference but cannot move.

The stall current value of the step motor 200 is a concept including both the current value applied to the step motor 200 and the time during which the current value is applied.

When the controller 140 determines the transfer conduit 130 as being in the restriction failure, the controller 140 resets the transfer conduit 130 from the set position to the initial position and re-attempts discharge of the washer fluid with the same nozzle unit 110.

As described above, a stall attempt mode in which the discharge of the washer fluid is re-attempted is a mode of reconfirming restriction of the step motor at regular intervals for a unit time so as to confirm whether a restriction failure of the transfer conduit 130 actually occurs. The controller 140 is configured to apply power to the step motor at regular intervals for a predetermined time.

In a state of re-attempting the discharge of the washer fluid, when the stall current value applied to the step motor 200 exceeds the predetermined stall current value, the controller 140 is configured to switch to a protection mode so as to interrupt driving of the step motor 200 and configured to transmit a failure to the user.

Figure 3A:
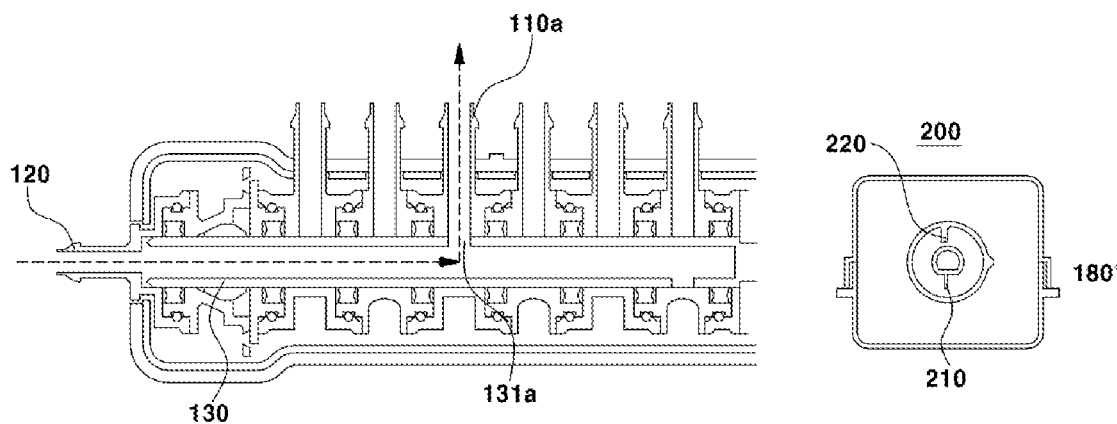
FIG. 3A is a diagram illustrating an engagement relationship of a transfer conduit in an initial position state according to one embodiment of the present disclosure.

FIG. 3A illustrates a configuration in which the transfer conduit 130 is located at an initial position in the washer liquid distribution device 100 including six nozzle units 110.

An initial position is set such that a first nozzle unit 110*a* close to a center of the transfer conduit 130 in the length direction and a first discharge hole 131*a* of the transfer conduit 130 are configured at a position at which the first nozzle unit 110*a* corresponds to the first discharge hole 131*a*.

That is, when an initial condition is satisfied with a starting-on or an autonomous driving condition of the vehicle, the transfer conduit 130 has an initial position at a position at which the guide 210 of the step motor 200 has an angle of 180 degrees based on a position of an uppermost end. In response to a signal applied to the controller 140, the controller 140 controls the transfer conduit 130 to be rotated in the clockwise direction or the counterclockwise direction, thereby controlling the washer fluid to be discharged to the first nozzle unit 110*a* corresponding to the applied signal.

More preferably, the guide 210 of the step motor 200 is configured to recognize an angle of zero degree based on a rib 220 located at the uppermost end, and the number of pulses stored in the controller 140 is applied to the step motor 200 so that the guide 210 is configured to be rotated to the initial position.

Further, when the starting or the autonomous driving condition of the vehicle is applied as the initial condition, the step motor 200 is configured such that the guide 210 comes into contact with the rib 220 and then is switched to the initial position so that the amount of the rotation of the step motor 200 may be measured without a separate sensor.

Further, after coming into contact with the rib 220, the guide 210 is switched to the initial position, and thus, when the position failure of the transfer conduit 130 occurs due to insufficient rotation of the transfer conduit 130, an amount of rotation of the transfer conduit 130 may be reset based on the rib 220 and the guide 210.

As described above, the transfer conduit 130 is located at the initial position such that the first nozzle unit 110*a* closest to the center of the transfer conduit 130 in the length direction corresponds to the first discharge hole 131*a*.

Figure 3B:
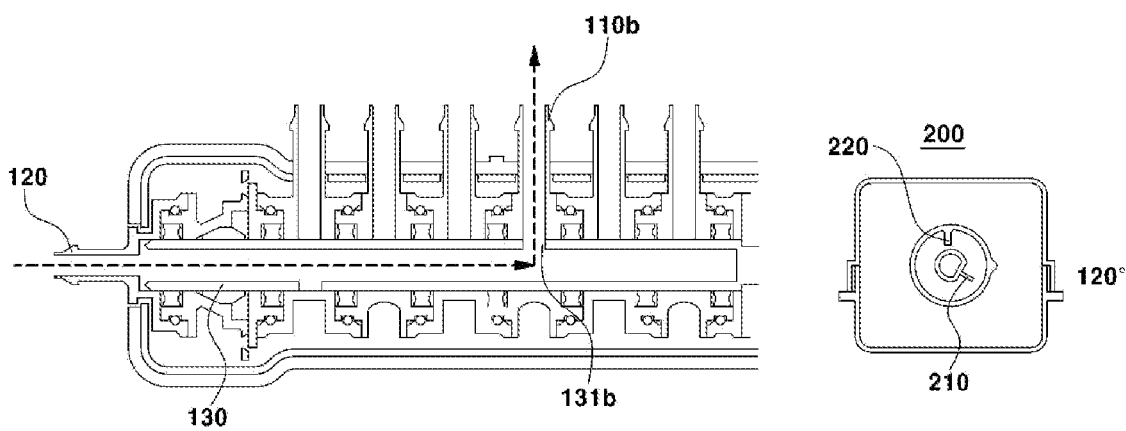
FIG. 3B is a diagram illustrating the engagement relationship of the transfer conduit in a state in which a channel 2 is connected according to one embodiment of the present disclosure.

FIG. 3B illustrates a configuration in which a second nozzle unit 110*b* and a second discharge hole 131*b* are switched to a position at which the second nozzle unit 110*b* corresponds to the second discharge hole 131*b* in a state in which the guide 210 is rotated at an angle of 120 degrees based on the rib 220.

In response to a washing request of the vehicle, the controller 140 is configured to apply a pulse voltage to the step motor 200 so that the transfer conduit 130 has an angle of 120 degrees based on the rib 220 so as to spray the washer fluid onto the second nozzle unit 110*b*.

Thus, the transfer conduit 130 is configured to be rotated to have an angle of 120 degrees from the rib 220 and configured such that the second nozzle unit 110*b* faces the second discharge hole 131*b* corresponding thereto.

Figure 3C:
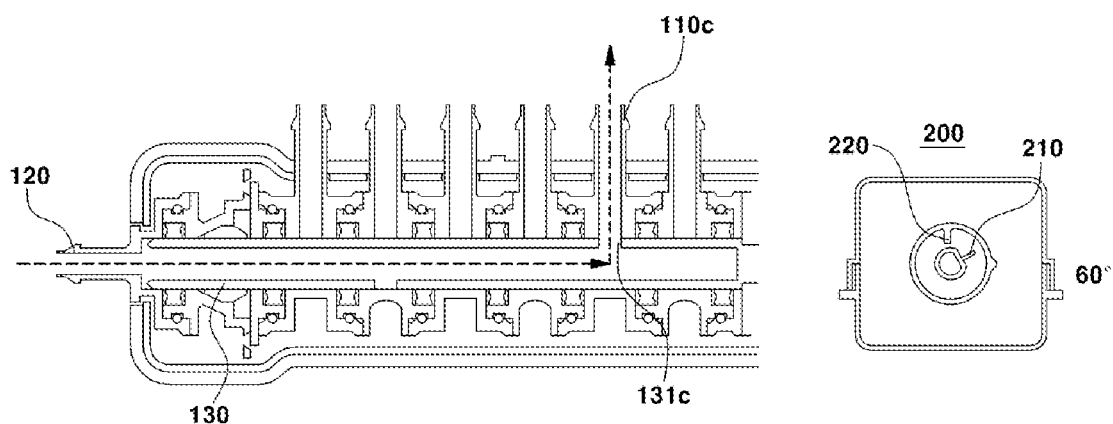
FIG. 3C is a diagram illustrating the engagement relationship of the transfer conduit in a state in which a channel 3 is connected according to one embodiment of the present disclosure.

FIG. 3C illustrates a configuration in which a third nozzle unit 110*c* and a third discharge hole 131*c* are switched to a position at which the third nozzle unit 110*c* corresponds to the third discharge hole 131*c* in a state in which the guide 210 is rotated at an angle of 160 degrees based on the rib 220.

In response to the washing request of the vehicle, the controller 140 is configured to apply the pulse voltage to the step motor 200 so that the transfer conduit 130 has an angle of degrees based on the rib 220 so as to spray the washer fluid onto the third nozzle unit 110*c*.

Thus, the transfer conduit 130 is configured to be rotated to have an angle of 60 degrees from the rib 220 and configured such that the third nozzle unit 110*c* faces the third discharge hole 131*c* corresponding thereto.

Figure 3D:
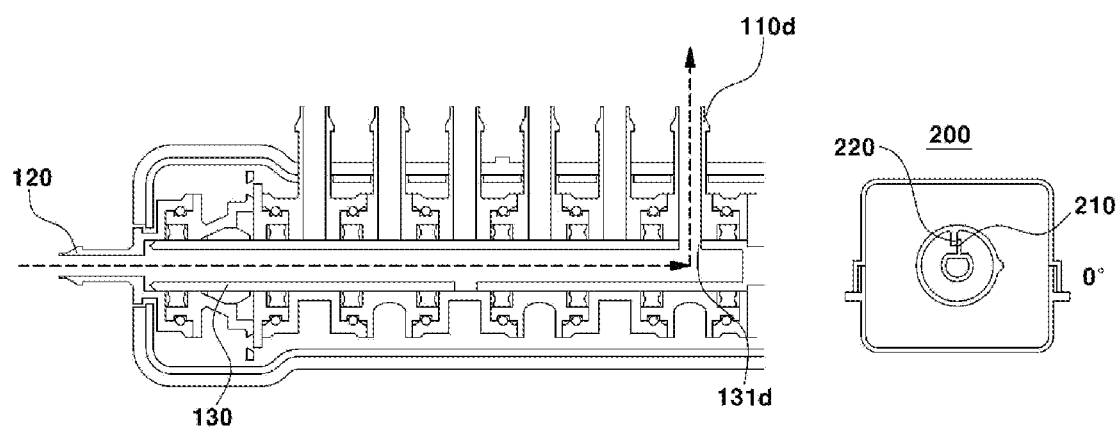
FIG. 3D is a diagram illustrating the engagement relationship of the transfer conduit in a state in which a channel 4 is connected according to one embodiment of the present disclosure.

FIG. 3D illustrates a configuration in which a fourth nozzle unit 110*d* and a fourth discharge hole 131*d* are switched to a position at which the fourth nozzle unit 110*d* corresponds to the fourth discharge hole 131*d* in a state in which the guide 210 is rotated to come into contact with the rib 220.

In response to the washing request of the vehicle, the controller 140 is configured to apply the pulse voltage to the step motor 200 so that the guide 210 comes into contact with the rib 220 to have an angle of zero degree so as to spray the washer fluid onto the fourth nozzle unit 110*d*.

Thus, the transfer conduit 130 is configured such that the fourth nozzle unit 110d faces the fourth discharge hole 131d corresponding thereto.

Figure 3E:
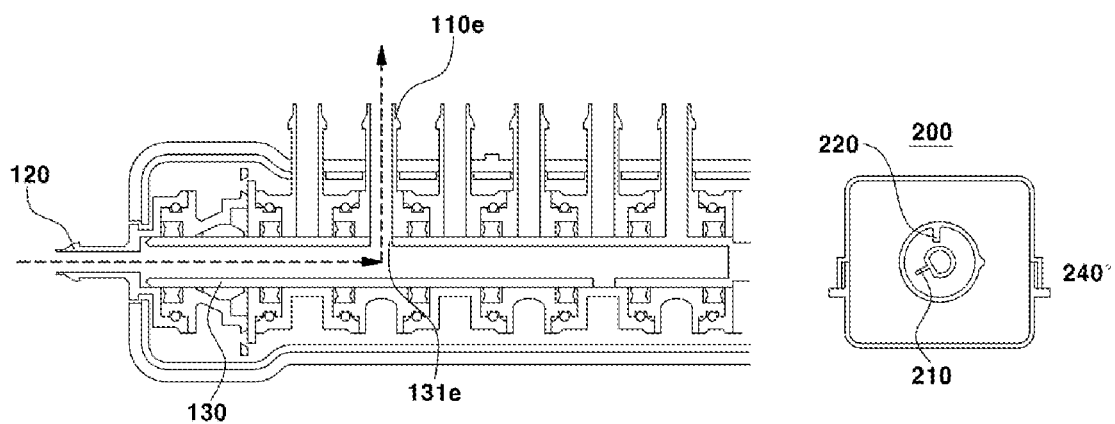
FIG. 3E is a diagram illustrating the engagement relationship of the transfer conduit in a state in which a channel 5 is connected according to one embodiment of the present disclosure.
Figure 3F:
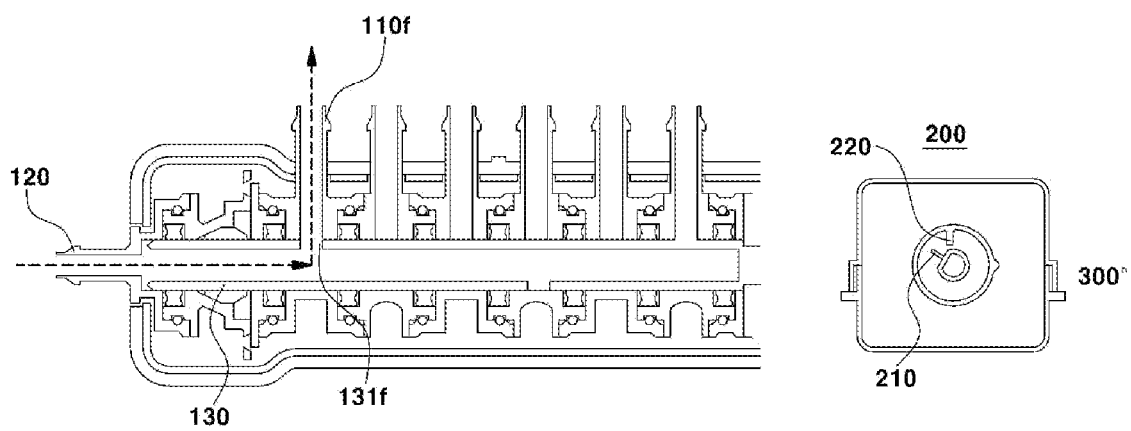
FIG. 3F is a diagram illustrating the engagement relationship of the transfer conduit in a state in which a channel 6 is connected according to one embodiment of the present disclosure.

In contrast, in FIG. 3E, the transfer conduit 130 is configured to have an angle of 240 degrees based on the rib 220 so that a fifth nozzle unit 110e is fluidly connected to a fifth discharge hole 131e corresponding thereto, and in FIG. 3F, the transfer conduit 130 is configured to have an angle of 300 degrees so that a sixth nozzle unit 110f is fluidly connected to a sixth discharge hole 131f corresponding thereto.

That is, the guide 210 is configured to be rotated at an angle of 180 degrees in the clockwise direction or the counterclockwise direction based on the initial position, and thus, even when the washer fluid is discharged to the nozzle units 110 located at both distal ends of the transfer conduit 130, the transfer conduit 130 is formed to have only a rotation angle of 180 degrees in two directions.

Further, the controller 140 returns the transfer conduit 130 to the initial position after rotating the transfer conduit 130 so as to spray the washer fluid to the nozzle unit 110 requested for cleaning and then controls the transfer conduit 130 to perform the requested cleaning.

However, although FIGS. 3A to 3F illustrate one embodiment including the six nozzle units 110, the rotation angle of the transfer conduit 130 and the position of the discharge hole 131 may be set according to the number of nozzles.

Figure 4:
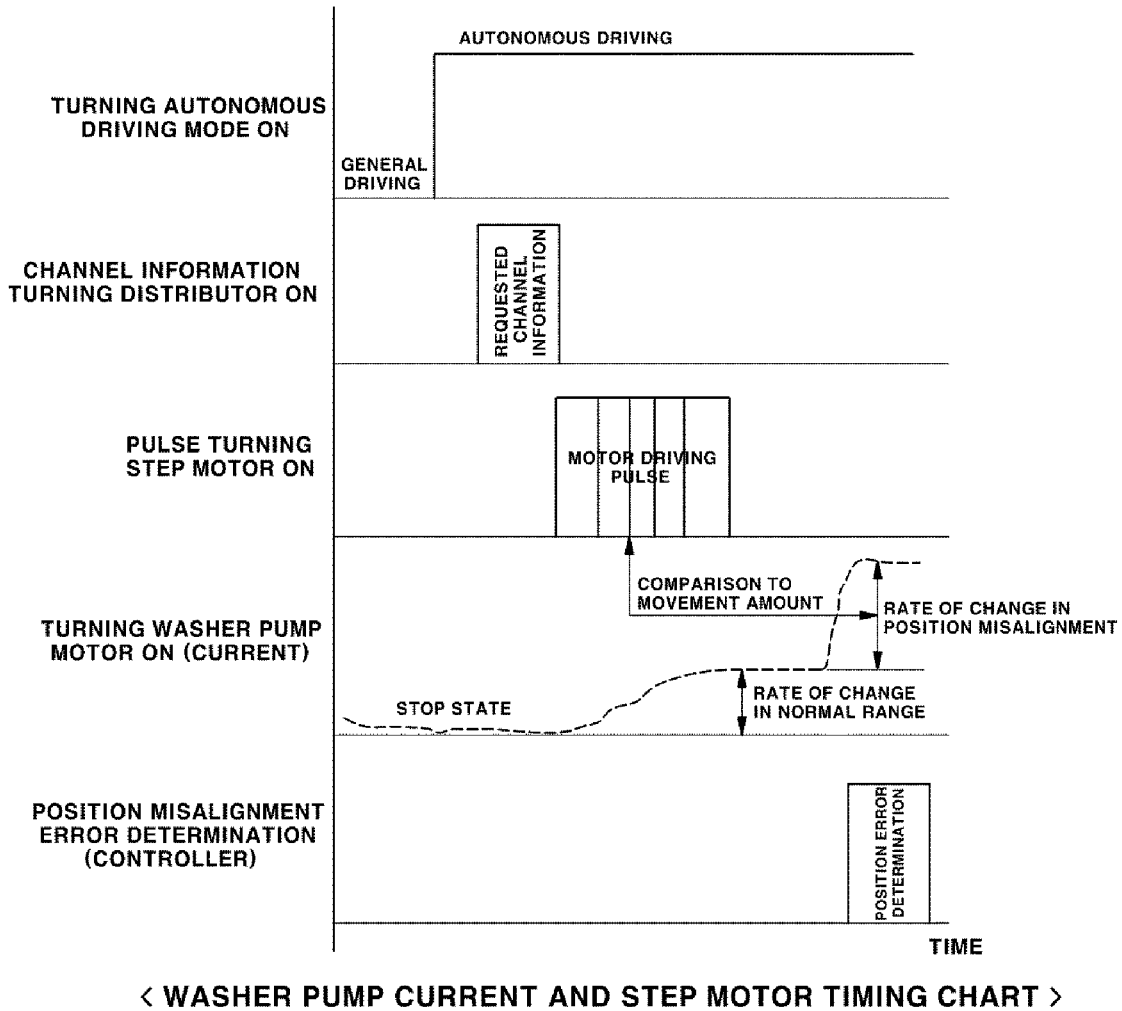
FIG. 4 is a diagram showing a current value according to a position failure state of the transfer conduit according to one embodiment of the present disclosure.

FIG. 4 illustrates a rate of change in current applied to the washer pump motor 300 when a position failure of the transfer conduit 130 occurs according to one embodiment of the present disclosure.

As shown in FIG. 4, in a condition in which a driving environment of the vehicle is autonomous driving, the controller 140 receives a cleaning request signal with respect to each device located at an outer side of the vehicle through the nozzle unit 110.

In response to the received cleaning request signal, the controller 140 is configured to rotate the transfer conduit 130 by applying a pulse signal to the step motor 200.

It is configured such that the washer fluid is introduced into one end of the rotated transfer conduit 130, and the washer fluid introduced into the nozzle unit 110 fluidly connected through the discharge hole 131 is discharged.

However, when the transfer conduit 130 is not rotated to a corresponding position at which the discharge hole 131 is fluidly connected to the nozzle unit 110, a current value applied to the washer pump motor 300 and a time during which the current value is applied exceeds a change value of a current which is predetermined in the controller 140.

Thus, the controller 140 measures the applied current value and the time during which the current value is applied as a rate of change in current of the washer pump motor 300, and when the rate of change in current exceeds a predetermined rate of change in current, the controller 140 determines the transfer conduit 130 as being in a position failure.

Figure 5:
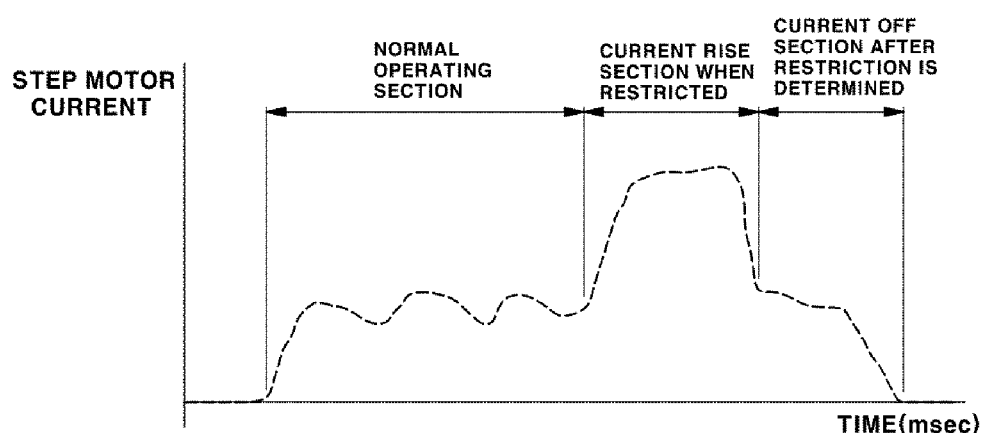
FIG. 5 is a diagram showing a current value according to a restriction failure state of the transfer conduit according to one embodiment of the present disclosure.

When the transfer conduit 130 is determined as being in the position failure, the controller 140 is configured to transmit a failure to the vehicle to provide an alarm to the user. FIG. 5 illustrates a stall current value applied to step motor 200 so as to determine a restriction failure of the transfer conduit 130 according to another embodiment of the present disclosure.

The controller 140 determines whether the transfer conduit 130 is restricted due to a seizure of the transfer conduit 130 to the housing or a seizure between the step motor 200 and the transfer conduit 130.

The controller 140 is configured to measure the stall current value applied to the step motor 200. The stall current value is a concept including a current applied to the step motor 200 and a time during which the current is applied.

As shown in FIG. 5, the stall current value measured from the step motor 200 is applied as a current that is less than or equal to a current value predetermined in the controller 140 in a normal operation section. However, when the restriction of the transfer conduit 130 occurs, it is shown that a current value applied to the step motor 200 and an application time of the current value exceed reference values predetermined in the controller 140 according to the rotation of the transfer conduit 130.

When the stall current value of the step motor 200 exceeds the predetermined stall current value, the controller 140 is configured to determine the transfer conduit 130 as being in a restriction failure, interrupt the driving of the step motor 200, and release position initialization of the guide 210.

As described above, the controller 140 determines whether the transfer conduit 130 is restrained and measures the stall current value applied to the step motor 200 so as to allow the rotation of the transfer conduit 130 to be performed, thereby determining whether the restriction failure of the transfer conduit 130 occurs. Further, in a failure state, the step motor 200 and the transfer conduit 130 are controlled to be interrupted in rotation thereof so that the step motor 200 and the transfer conduit 130 may be protected.

Figure 6:
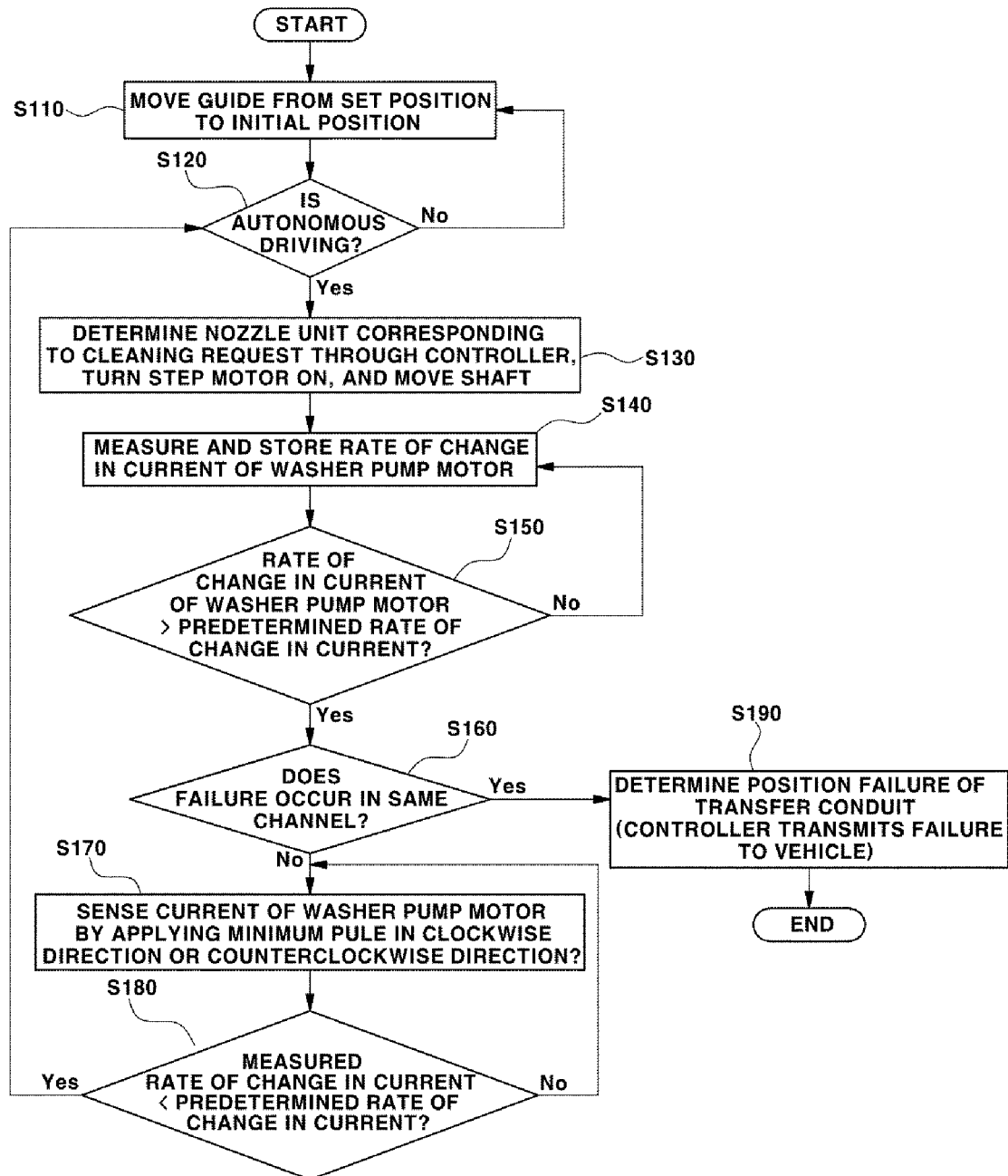
FIG. 6 is a flowchart illustrating determination of the position failure state of the transfer conduit according to one embodiment of the present disclosure.

FIG. 6 illustrates a flowchart of determination of the position failure state of the transfer conduit 130 in performing of a method of distributing a washer fluid according to one embodiment of the present disclosure.

In the washer liquid distribution device 100 of the present disclosure, the method includes determining whether a device cleaning request of the vehicle is applied to the controller 140 in a state in which the vehicle is switched to an autonomous driving mode.

When the device cleaning request of the vehicle is received, the controller 140 is configured to control the transfer conduit 130 to discharge the washer fluid to the nozzle unit 110 to which the received request corresponds.

More preferably, the transfer conduit 130 includes the number of discharge holes 131 corresponding to that of the nozzle unit 110, and the discharge holes 131 are located to be spaced apart by as much a predetermined angle based on a central axis of the transfer conduit 130 so that it is configured such that the transfer conduit 130 is rotated and the discharge holes 131 are fluidly connected to the nozzle units 110 which are corresponding to the discharge holes 131 and to which the cleaning request of the vehicle corresponds.

Further, the transfer conduit 130 is configured to be rotated by the step motor 200 so that the controller 140 applies a pulse voltage to the step motor 200 so as to control an amount of rotation of the transfer conduit 130.

Then, the controller 140 is configured to drive the washer pump motor 300 to allow the washer fluid to be introduced into the introduction part 120 engaged with one end of the transfer conduit 130.

However, since the controller 140 is configured to measure a current change value of the washer pump motor 300, the method includes determining whether the current change value applied to the washer pump motor 300 exceeds a predetermined current change value.

When the current change value applied to the washer pump motor 300 is less than or equal to the predetermined current change value, the current change value applied to the washer pump motor 300 is continuously measured, and when the current change value applied to the washer pump motor 300 exceeds the predetermined current change value, it is determined again whether the current change value applied to the washer pump motor 300 in the same nozzle unit 110 exceeds the predetermined current change value.

In the same nozzle unit 110, when the current change value applied to the washer pump motor 300 exceeds the predetermined current change value, the controller 140 is configured to determine the transfer conduit 130 as being in a position failure and transmit the position failure to the vehicle.

That is, in a case in which a load occurs on the washer pump motor 300 due to an insufficient or excessive amount of rotation of the transfer conduit 130, the controller 140 determines a failure in which a position of the nozzle unit 110 corresponding to the cleaning request does not match a position of the discharge unit 131 located in the transfer conduit 130.

In the same nozzle unit 110, when the current change value applied to the washer pump motor 300 is less than or equal to the predetermined current change value, the controller 140 gradually moves the step motor 200 in the clockwise direction or the counterclockwise direction and thus senses a current value of the washer pump motor 300.

When the current change value of the washer pump motor 300 due to the gradual movement of the step motor 200 is in a normal range, the controller 140 terminates a logic, and, when the current change value of the washer pump motor 300 due to the gradual movement of the step motor 200 is out of the normal range, the controller 140 maintains to sense the current change value due to the gradual movement of the step motor 200.

When the step motor 200 is gradually moved, the controller 140 is configured to rotate the transfer conduit 130 by applying a pulse voltage in a minimum unit. Thus, as the washer fluid is discharged through each nozzle unit 110, the controller 140 is configured to measure the current change value applied to the washer pump motor 300 and determine whether the discharge of the washer fluid of a corresponding nozzle unit 110 is a normal range.

As described above, in the present disclosure, the controller 140 determines whether the discharge hole 131 corresponding to the nozzle unit 110 is controlled to located at a position matching a discharge part of the nozzle unit 110, and, when the discharge hole 131 is not controlled to be located at the matched position, the controller 140 determines the transfer conduit 130 as being in the position failure.

FIG. 7 illustrates a flowchart of determination of whether a restriction failure of the transfer conduit 130 occurs according to another embodiment of the present disclosure.

The washer liquid distribution device 100 is configured such that the guide 210 of the first step motor 200 is initially switched to the set position, which is a position in contact with the rib 220, and then rotated to a start position.

Thereafter, whether autonomous driving is performed is determined, and when the vehicle is determined as being in the autonomous driving, the method includes determining whether a device cleaning request of the vehicle is applied to the controller 140.

When the device cleaning request of the vehicle is received, the controller 140 is configured to control the transfer conduit 130 to discharge the washer fluid to the nozzle unit 110 to which the received request corresponds.

More preferably, the transfer conduit 130 includes the number of discharge holes 131 corresponding to that of the nozzle unit 110, and the discharge holes 131 are located to be spaced apart by as much as a predetermined angle based on a central axis of the transfer conduit 130 so that it is configured such that the transfer conduit 130 is rotated and the discharge holes 131 are fluidly connected to the nozzle units 110 to which the cleaning request of the vehicle corresponds.

Further, since the transfer conduit 130 is configured to rotated due to the step motor 200, the controller 140 is configured to measure the stall current value applied to the step motor 200 and an amount of rotation of the step motor 200.

Thereafter, the method includes determining whether the stall current value of the step motor 200 exceeds a stall current value predetermined in the controller 140.

When the measured stall current value of the step motor 200 exceeds the predetermined stall current value, the method includes switching to the stall attempt mode and then re-determining whether the measured stall current value of the step motor 200 exceeds the predetermined stall current value.

When the stall current value of the step motor 200 is less than or equal to the stall current value predetermined in the controller 140, or when the stall current value of the step motor 200 is determined as being less than or equal to the stall current value predetermined in the controller 140 through the redetermination, the controller 140 normally drive the washer liquid distribution device 100.

On the other hand, when the stall current value of the step motor 200 on which the redetermination is performed exceeds the stall current value predetermined in the controller 140, the controller 140 is configured to interrupt the step motor 200 and release the position initialization of the transfer conduit 130.

Subsequently, the method includes transmitting the restriction failure of the transfer conduit 130 to the vehicle.

As described above, the controller 140 of the present disclosure is configured to determine the restriction failure of the transfer conduit 130 and the stall current value of the step motor 200.

Further, the position failure and the restriction failure of the transfer conduit 130 shown in FIGS. 6 and 7 may be determined simultaneously or sequentially.

The present disclosure can obtain the following effects according to a combination of the above-described embodiments and a configuration, which will be described below, and a use relationship.

The present disclosure has an effect of configuring a plurality of nozzle units and controlling a selective position of a transfer conduit so that a washer fluid is sprayed into various branches through driving of a single washer pump motor.

Further, in accordance with the present disclosure, a failure of the washer fluid distribution device can be determined on the basis of a current value applied to a step motor or the washer pump motor without a separate sensor configuration so that there is an effect in which an assembly cost is relatively inexpensive.

The foregoing detailed description illustrates the present disclosure. Further, the foregoing is intended to illustrate and describe the exemplary embodiments of the present disclosure, and the present disclosure may be used in various other combinations, modifications, and environments. That is, it is possible to make alternations or modifications without departing from the scope of the present disclosure disclosed in this specification, equivalents, and/or within the technical or knowledge scope in the art to which the present disclosure pertains. The described embodiments are intended to illustrate the best mode for carrying out the technical spirit of the present disclosure and various modification can made in the specific applications and uses of the present disclosure. Therefore, the detailed description is not intended to limit the present disclosure as in the disclosed embodiments. Further, it should be construed that the appended claims are intended to include another embodiment.

What is claimed is:

1. A method of distributing a washer fluid, comprising:
   determining, by a controller, whether an initial condition is satisfied;
   when the initial condition is satisfied, determining, by the controller, an input of a cleaning request;
   moving, by the controller, a transfer conduit such that a discharge hole is located at a position corresponding to a nozzle unit;
   when the discharge hole of the transfer conduit is located at a position corresponding to the nozzle unit, driving, by the controller, a washer pump motor; and
   measuring, by the controller, current values applied to the washer pump motor and a step motor and detecting a failure.

2. The method of claim 1, wherein determining the initial condition includes executing an autonomous driving mode of the vehicle.

3. The method of claim 1, wherein measuring the current values applied to the washer pump motor and the step motor and detecting the failure includes transmitting an error signal to a user when the current values applied to the washer pump motor and the step motor are out of a normal range.

4. The method of claim 1, wherein determining the initial condition includes switching the transfer conduit from a set position to an initial position.

5. The method of claim 4, wherein switching the transfer conduit from the set position to the initial position includes:
   moving the transfer conduit to the set position; and
   moving the transfer conduit to the initial position in a state in which a restrained current is applied to the step motor for a time that is longer than a predetermined sustaining time.

6. The method of claim 1, wherein measuring the current values applied to the washer pump motor and the step motor and detecting the failure includes:
   detecting a position failure of the transfer conduit; and
   detecting a restriction failure of the transfer conduit.

7. The method of claim 6, wherein detecting the position failure of the transfer conduit includes:
   measuring, by the controller, a rate of change in current applied to the washer pump motor in a state in which the discharge hole of the transfer conduit is controlled to be located at a position corresponding to the nozzle unit;
   determining whether the measured rate of change in current exceeds a rate of change in current predetermined in the controller;
   when the measured rate of change in current exceeds the predetermined rate of change in current, re-determining whether the rate of change in current of the washer pump motor exceeds the predetermined rate of change in current in the same nozzle unit; and
   when the rate of change in current is determined as exceeding the predetermined rate of change in current in the same nozzle unit, determining the transfer conduit as being in the position failure.

8. The method of claim 7, wherein determining the transfer conduit as being in the position failure includes transmitting failure information to a vehicle.

9. The method of claim 6, wherein detecting the restriction failure of the transfer conduit includes:
   measuring a stall current value of the step motor;
   determining whether the measured stall current value of the step motor exceeds a predetermined stall current value; and
   when the measured stall current value of the step motor exceeds the predetermined stall current value, determining that a restriction failure of the transfer conduit occurs and transmitting failure information.

10. The method of claim 9, wherein determining whether the measured stall current value of the step motor exceeds the predetermined stall current value includes:
    when the measured stall current value of the step motor exceeds the predetermined stall current value, executing a stall attempt mode;
    re-determining whether the stall current value of the step motor exceeds the predetermined stall current value; and
    when the stall current value of the step motor re-exceeds the predetermined stall current value, interrupting the step motor.

* * * * *